US012491657B2

(12) United States Patent
Shimamura

(10) Patent No.: US 12,491,657 B2
(45) Date of Patent: Dec. 9, 2025

(54) STAPLER

(71) Applicant: Max Co., Ltd., Tokyo (JP)

(72) Inventor: Masashi Shimamura, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/756,849

(22) Filed: Jun. 27, 2024

(65) Prior Publication Data

US 2025/0001641 A1 Jan. 2, 2025

(30) Foreign Application Priority Data

Jun. 30, 2023 (JP) ................................ 2023-107868

(51) Int. Cl.
*B27F 7/19* (2006.01)
*B27F 7/30* (2006.01)

(52) U.S. Cl.
CPC . *B27F 7/19* (2013.01); *B27F 7/30* (2013.01)

(58) Field of Classification Search
CPC .................................... B27F 7/19; B27F 7/30
USPC .......................................................... 227/140
See application file for complete search history.

(56) References Cited

U.S. PATENT DOCUMENTS 2,770,805 A 11/1956 Philip et al.
5,791,543 A 8/1998 Udagawa et al.
5,806,750 A 9/1998 Yamanushi et al.
7,014,091 B2 * 3/2006 Mochizuki ................ B27F 7/36
227/155
2025/0001642 A1 * 1/2025 Kenjo ....................... B27F 7/19

FOREIGN PATENT DOCUMENTS

| | | | |
|---|---|---|---|
| CH | 351393 | A | 1/1961 |
| DE | 33191 | C | 10/1885 |
| DE | 4020355 | A1 | 1/1992 |
| EP | 605888 | A1 | 7/1994 |
| EP | 2476522 | A1 | 7/2012 |
| JP | 3526682 | B2 | 5/2004 |
| JP | 5310381 | B2 | 10/2013 |

OTHER PUBLICATIONS

Aug. 30, 2024—(EP) Extended EP Search Report—EP App 24185066.8.

* cited by examiner

*Primary Examiner* — Praachi M Pathak
(74) *Attorney, Agent, or Firm* — Banner & Witcoff, Ltd.

(57) ABSTRACT

A stapler for performing binding processing of binding a sheet with a staple, the stapler includes: a driver unit configured to drive the staple to the sheet; a bending unit configured to bend a staple leg of the staple that is driven by the driver unit and penetrates the sheet; a single motor configured to operate the driver unit and the bending unit; a coupling portion coupling the driver unit and the bending unit on one side in a direction orthogonal to a sheet passing direction of the sheet passing between the driver unit and the bending unit and along the sheet surface in the case of performing the binding processing; and a transmission unit configured to transmit a driving force of the motor to at least one of the driver unit or the bending unit via the coupling portion.

10 Claims, 10 Drawing Sheets

STAPLER

CROSS-REFERENCE TO RELATED APPLICATIONS

The present application claims priority from Japanese Patent Application No. 2023-107868 filed on Jun. 30, 2023, the entire contents of which are incorporated herein by reference.

TECHNICAL FIELD

The present disclosure relates to a stapler configured to bind a bundle of sheets with a staple.

BACKGROUND ART

In a clincher device of a general stapler known in the related art, a fixing clincher having a guide groove for bending and guiding a pair of staple legs inward is disposed on a back surface side of a binding sheet, and the staple legs that are driven from a front surface side of the binding sheet toward the binding sheet by an operating unit and protrude to a binding sheet lower surface side of the staple legs are engaged with the guide groove, so that the staple legs are bent and guided inward.

In staple binding by the fixing clincher as described above, a height of a loop shape formed at base portions of the staple legs is larger than a thickness of the binding sheet, and a staple bound part has a large thickness.

In view of this, there is proposed an electric stapler including a movable clincher that is configured to engage with staple legs protruding to a lower surface side of a binding sheet through the binding sheet and bend the staple legs from a base portion side (for example, see JP3526682B).

Further, as a saddle binding electric stapler for binding a bundle of sheets, there is proposed an electric stapler vertically and separately provided with a driver unit including a driver that drives a staple, a clincher unit including a clincher configured to bend the driven staple, and a motor provided in each of the driver unit and the clincher unit (for example, see JP5310381B).

SUMMARY

In a saddle binding stapler used for binding a booklet, a flat clinch is desirable so that staple legs would not protrude from a fold of a spread page of the booklet. To implement the flat clinch, the staple legs are generally bent from bases using a movable clincher. However, a stapler using a movable clincher requires not only a motor for operating a driver but also a motor for operating the movable clincher.

A general electric stapler for square binding instead of saddle binding has a small sheet passing area, and thus a clincher and a driver can be disposed close to each other. For this reason, as described in JP3526682B, a structure that operates the driver and the clincher with one single motor can be relatively easily implemented. On the other hand, a saddle binding stapler requires a driver and a clincher separately from each other to ensure a large sheet passing area, making it structurally difficult to operate both the driver and the clincher with one single motor. Accordingly, a saddle binding stapler in the related art is separately provided with a motor for a driver and a motor for a clincher as described in JP5310381B.

However, providing the motors separately leads to an increase in a size of a stapler and an increase in the number of components, resulting in an increase in costs.

In view of this, illustrative aspects of the present disclosure provide a stapler that can operate both a driver and a clincher with one single motor even in a saddle binding stapler (that is, it can implement flat clinch) and can accordingly mitigate an increase in a size of the stapler, the number of components, and the associated costs.

One illustrative aspect of the present disclosure provides a stapler for performing binding processing of binding a sheet with a staple, the stapler including: a driver unit provided in a position orthogonal to a sheet surface of the sheet in a case of performing the binding processing, the driver unit being configured to punch the staple to the sheet; a bending unit provided in a position facing the driver unit through the sheet in the case of performing the binding processing, the bending unit being configured to bend a staple leg of the staple that is driven by the driver unit and penetrates the sheet; a single motor configured to operate the driver unit and the bending unit; a coupling portion coupling the driver unit and the bending unit on one side in a direction orthogonal to a sheet passing direction of the sheet passing between the driver unit and the bending unit and along the sheet surface in the case of performing the binding processing; and a transmission unit configured to transmit a driving force of the motor to at least one of the driver unit or the bending unit via the coupling portion.

In the present disclosure, an upstream side and a downstream side in a sheet passing direction of a sheet are opened between a driver unit and a bending unit, and the sheet can pass therethrough.

According to the present disclosure, a driver unit and a bending unit of a stapler can be operated by a single motor and a position of a fold of a booklet can be bound with a staple, and thus costs can be reduced.

DESCRIPTION OF EMBODIMENTS

Hereinafter, an illustrative embodiment of a stapler of the present disclosure will be described with reference to the drawings.

{Configuration Example of Stapler}

Figure 1A:
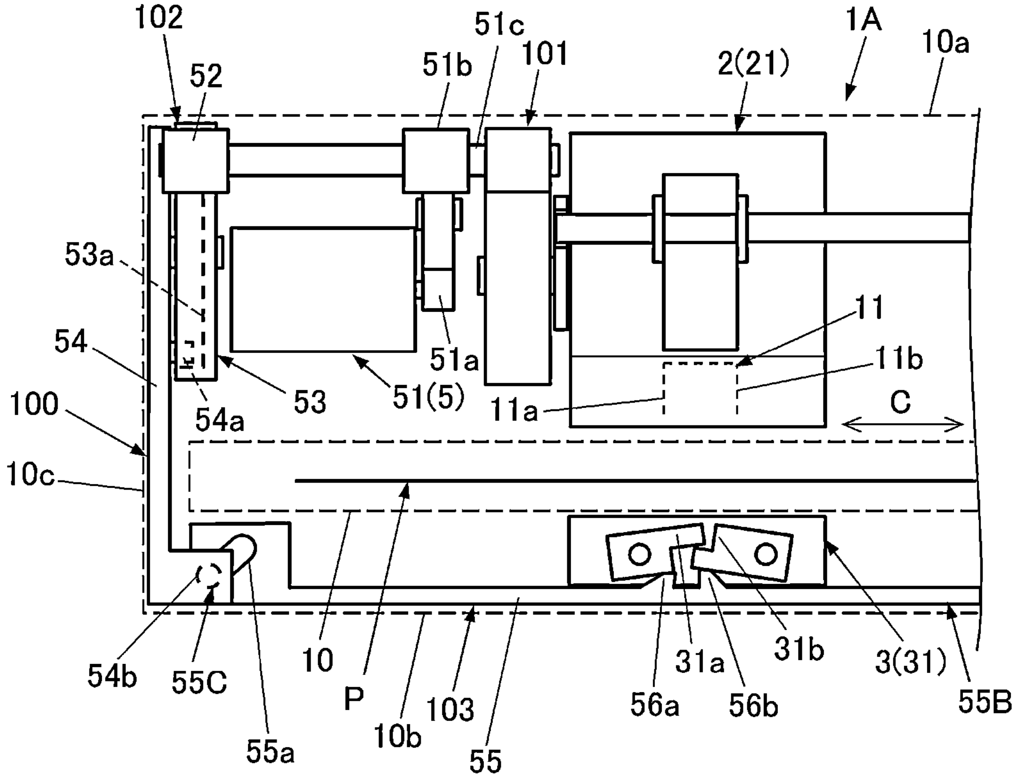
FIG. 1A is a front view illustrating an example of a stapler according to an illustrative embodiment.
Figure 1B:
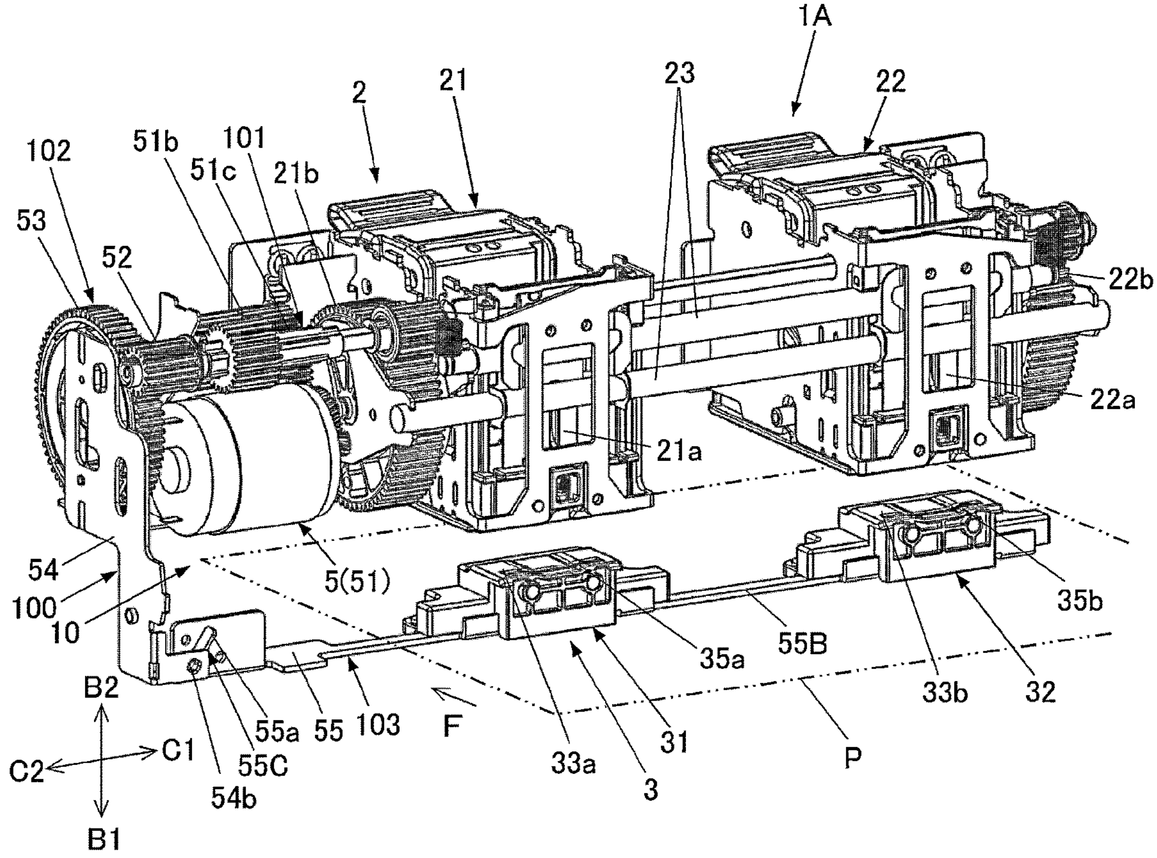
FIG. 1B is a perspective view illustrating a main portion of the example of the stapler according to the present illustrative embodiment.
Figure 1C:
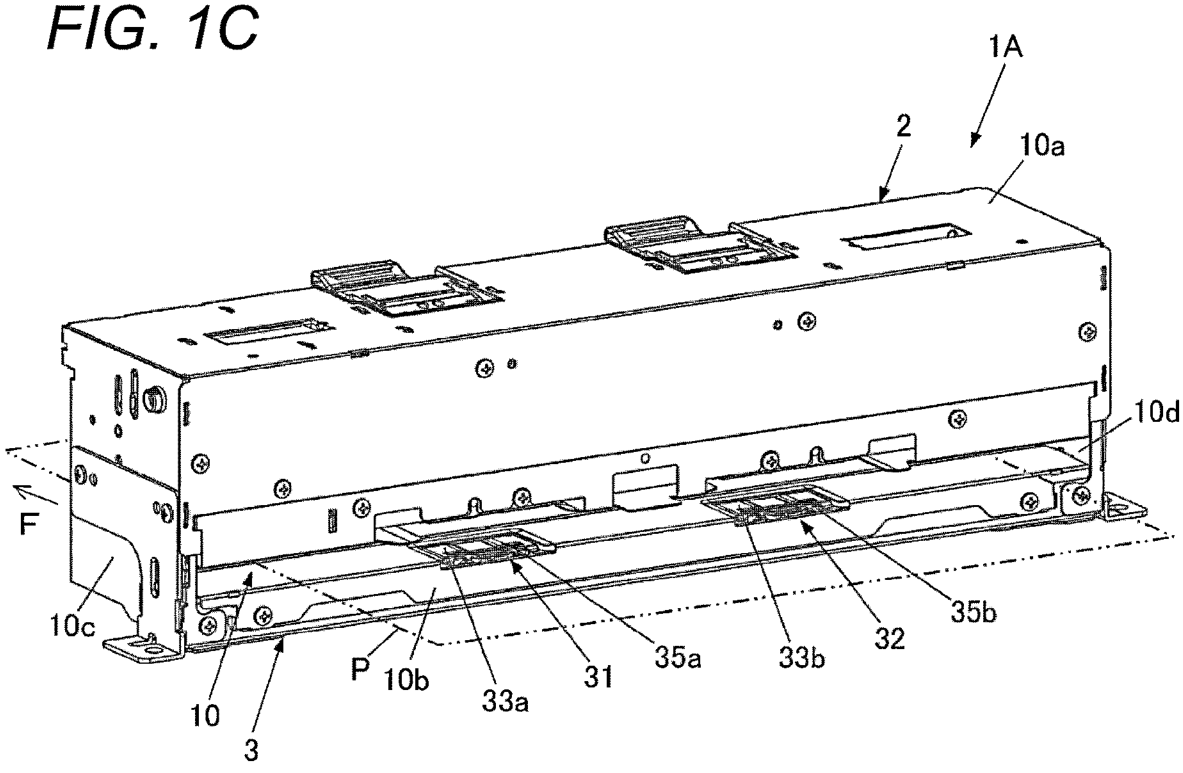
FIG. 1C is an external perspective view illustrating the example of the stapler according to the present illustrative embodiment.
Figure 2A:
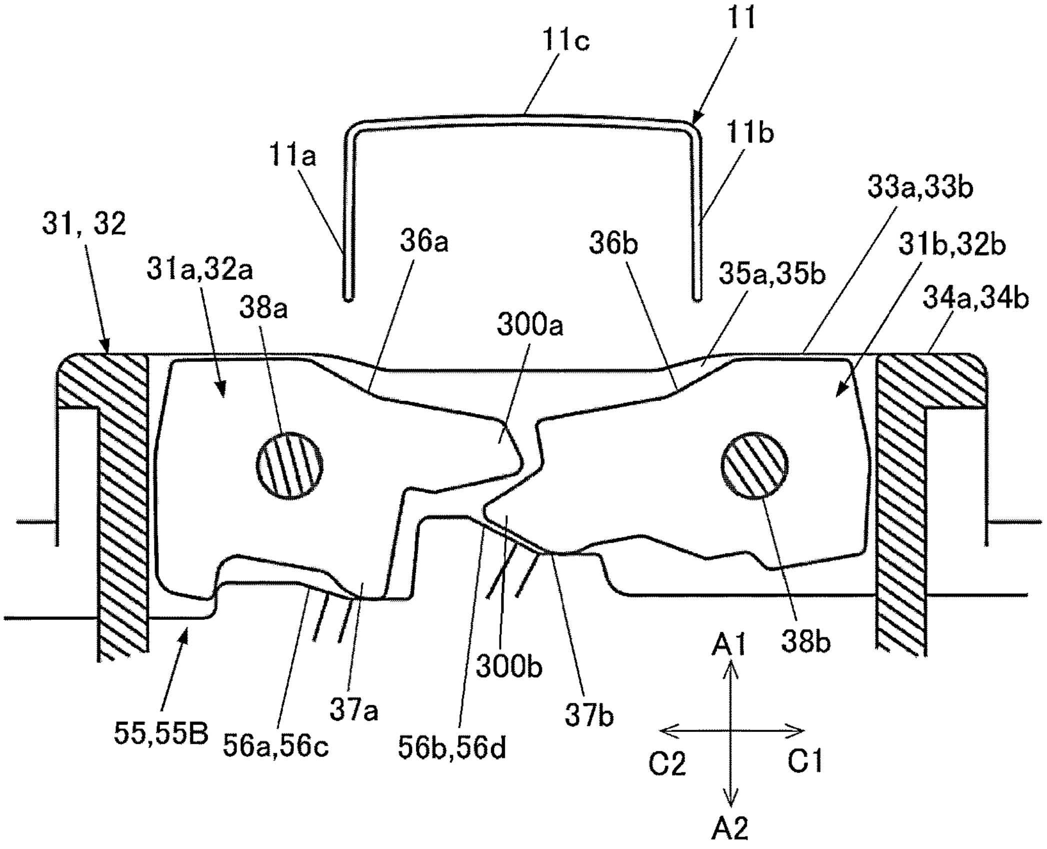
FIG. 2A is a front sectional view illustrating a main portion of an example of a bending unit of the stapler according to the present illustrative embodiment.
Figure 2B:
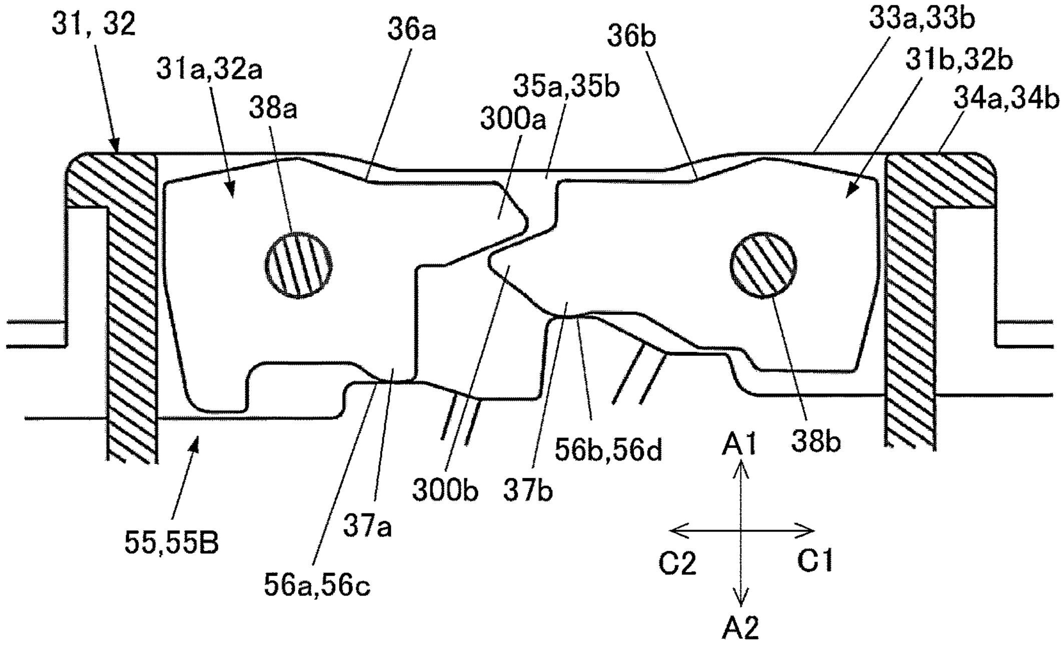
FIG. 2B is a front sectional view illustrating the main portion of the example of the bending unit of the stapler according to the present illustrative embodiment.
Figure 3A:
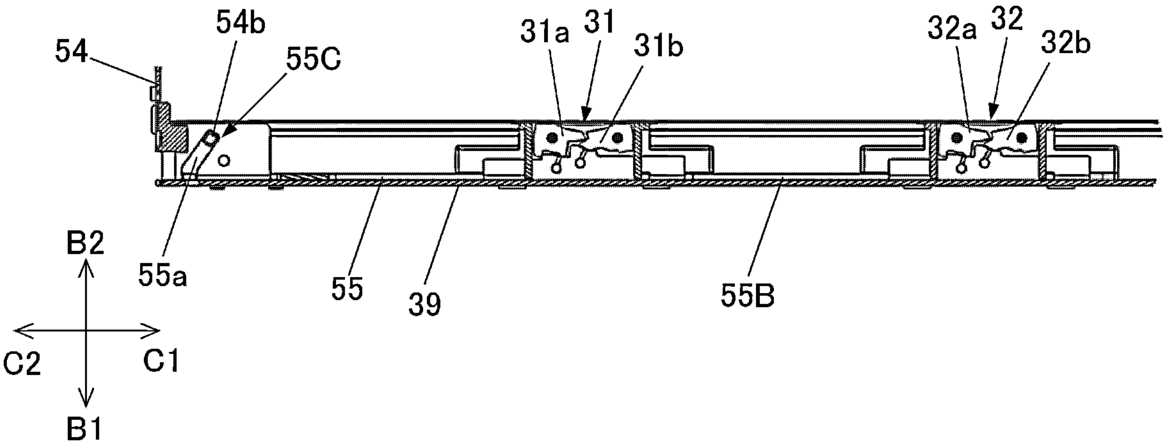
FIG. 3A is a front sectional view illustrating the example of the bending unit of the stapler according to the present illustrative embodiment.
Figure 3B:
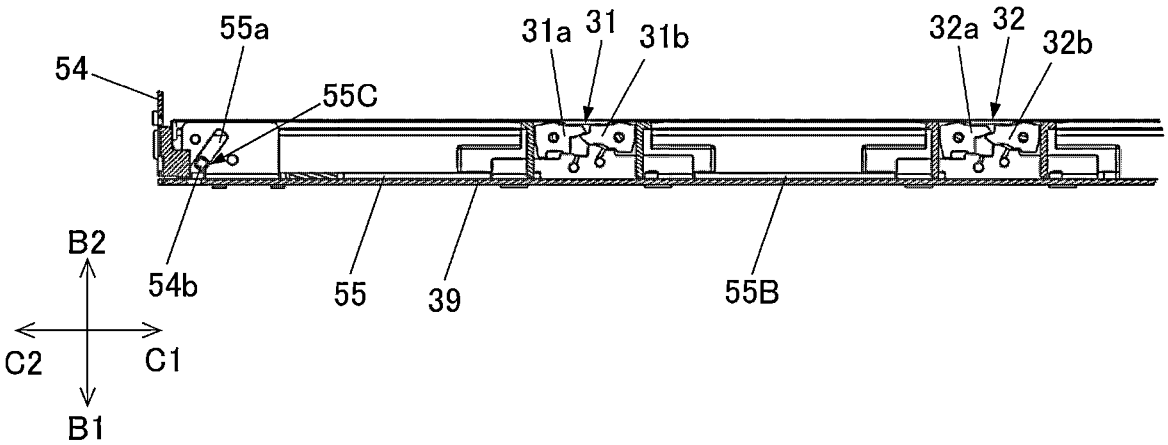
FIG. 3B is a front sectional view illustrating the example of the bending unit of the stapler according to the present illustrative embodiment.
Figure 4:
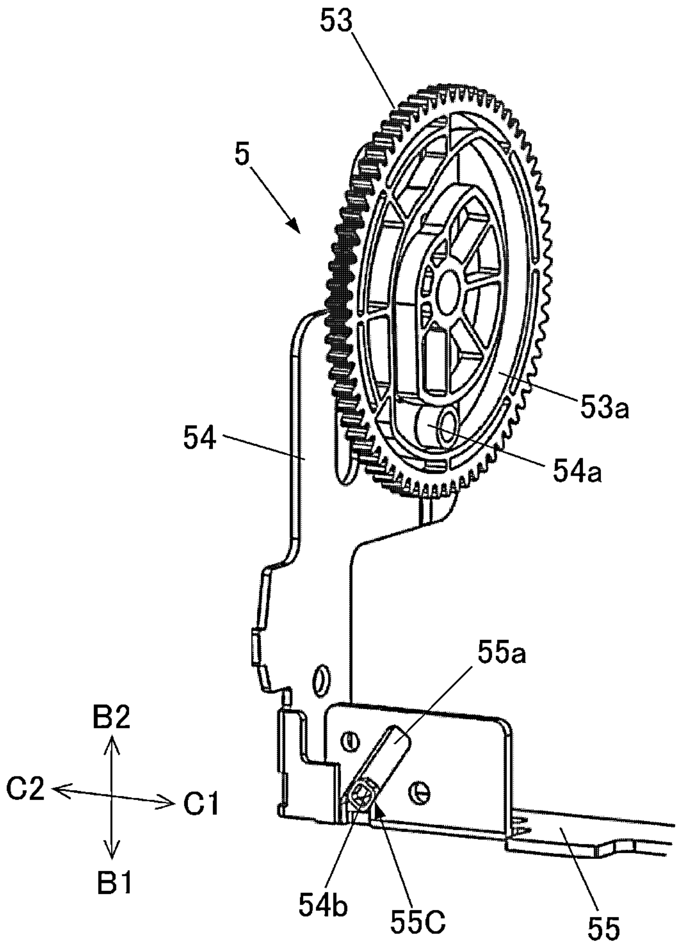
FIG. 4 is a perspective view illustrating a main portion of an example of an operating unit of the stapler according to the illustrative embodiment.

FIG. 1A is a front view illustrating an example of a stapler according to the present illustrative embodiment, FIG. 1B is a perspective view illustrating a main portion of the example of the stapler according to the present illustrative embodiment, and FIG. 1C is an external perspective view illustrating the example of the stapler according to the present illustrative embodiment. FIGS. 2A and 2B are front sectional views illustrating a main portion of an example of a bending unit of the stapler according to the present illustrative embodiment, and FIGS. 3A and 3B are front sectional views illustrating the example of the bending unit of the stapler according to the present illustrative embodiment. FIG. 4 is a perspective view illustrating a main portion of an example of an operating unit of the stapler according to the present illustrative embodiment.

A stapler 1A includes a driver unit 2, a bending unit 3, a coupling portion 100, transmission units 101, 102, and 103, and an operating unit 5. The driver unit 2 is provided in a position orthogonal to a sheet surface of a sheet P during binding processing of binding the sheet P with a staple 11, and is configured to punch the staple 11 to the sheet P. The bending unit 3 is provided in a position facing the driver unit 2 through the sheet P during the above-described binding processing, and is configured to bend a pair of staple legs 11*a* and 11*b* of the staple 11 that is driven by the driver unit 2 and penetrates the sheet P. The coupling portion 100 couples the driver unit 2 and the bending unit 3 on one side in a direction orthogonal to a sheet passing direction of the sheet P passing between the driver unit 2 and the bending unit 3 and along the sheet surface of the sheet P before and after the above-described binding processing. The sheet passing direction of the sheet P is indicated by an arrow F. An arrow C indicates the direction along the sheet surface of the sheet P. The operating unit 5 includes a single motor 51. The single motor 51 is configured to operate the driver unit 2 and the bending unit 3. The transmission unit 101 is configured to transmit a driving force of the motor 51 to the driver unit 2. The transmission unit 102 is configured to transmit the driving force of the motor 51 to the coupling portion 100. The transmission unit 103 is configured to transmit the driving force of the motor 51 to the bending unit 3 via the coupling portion 100. The coupling portion 100 and the transmission units 101, 102, and 103 will be described in detail later. The driver unit 2 and the bending unit 3 face each other across a sheet area 10. The stapler 1A includes a frame 10*a*, a frame 10*b*, and a pair of frames 10*c* and 10*d* connecting the frame 10*a* and the frame 10*b*. The sheet area 10 is formed by a space between the driver unit 2 and the bending unit 3. The space between the driver unit 2 and the bending unit 3 is defined by the frame 10*a*, the frame 10*b*, and the pair of frames 10*c* and 10*d* connecting the frame 10*a* and the frame 10*b*.

The frame 10*a* is provided with the driver unit 2 therein, which forms an exterior of the driver unit 2. The frame 10*a* is further provided with the motor 51 and the transmission units 101 and 102 therein. The frame 10*b* is provided with the bending unit 3 inside, which forms an exterior of the bending unit 3. The frame 10*b* further includes the transmission unit 103 therein. The frame 10*c* connects the frame 10*a* and the frame 10*b* on the one side in the direction orthogonal to the sheet passing direction of the sheet P indicated by the arrow F and along the sheet surface of the sheet P. The frame 10*c* is provided with the coupling portion 100 therein. The frame 10*d* connects the frame 10*a* and the frame 10*b* on the other side in the direction orthogonal to the sheet passing direction of the sheet P and along the sheet surface of the sheet P. The driver unit 2 does not protrude from the frame 10*a* to an inside of the sheet area 10 except when the sheet P is clamped between the driver unit 2 and the bending unit 3. The motor 51 and the transmission units 101 and 102 do not protrude from the frame 10*a* to the inside of the sheet area 10. The bending unit 3 and the transmission unit 103 do not protrude from the frame 10*b* to the inside of the sheet area 10. The coupling portion 100 does not protrude from the frame 10*c* to the inside of the sheet area 10.

Accordingly, the sheet area 10 is open upstream and downstream of the sheet passing direction of the sheet P, allowing the sheet P to pass therethrough. Two sides of the sheet area in the direction orthogonal to the sheet passing direction of the sheet P and along the sheet surface of the sheet P are blocked by the frames 10*c* and 10*d*. The frame 10*c* and the frame 10*d* face each other at an interval larger than a maximum width of the sheet P that can pass therethrough. The frame 10*a* and the frame 10*b* face each other at an interval larger than a thickness of a stack of a maximum number of sheets P that can be bound. The driver unit 2 and the bending unit 3 are coupled to each other via the frames 10*c* and 10*d* on two sides in the direction orthogonal to the sheet passing direction of the sheet P and along the sheet surface of the sheet P.

The driver unit 2 includes a first driver unit 21, a second driver unit 22, and a power transmission unit 23. The first driver unit 21 is an example of a driver unit or a first driver unit. The staple 11 driven by the first driver unit 21 is an example of a first staple, and the pair of staple legs 11*a* and 11*b* of the staple 11 driven by the first driver unit 21 are examples of staple legs of the first staple. The second driver unit 22 is an example of a second driver unit. The staple 11 driven by the second driver unit 22 is an example of a second staple. The pair of staple legs 11*a* and 11*b* of the staple 11 driven by the second driver unit 22 are examples of staple legs of the second staple.

The first driver unit 21 includes a driver plate 21*a* and a power transmission unit 21*b*. The driver plate 21*a* is supported in a manner of being movable along an extending direction of the pair of staple legs 11*a* and 11*b* of the staple 11. The power transmission unit 21*b* includes, for example, a gear that makes up a cam and a link that is displaceable by rotation of the gear. The power transmission unit 21*b* is configured to transmit movement of the operating unit 5 to the driver plate 21*a*. The driver plate 21*a* is configured to be operated by the operating unit 5 via the power transmission unit 21*b* and to punch the staple 11. The first driver unit 21 includes a forming plate for shaping the staple 11. The first driver unit 21 further includes an attachment portion to which a cartridge accommodating the staple 11 before shaping is removably mounted.

The second driver unit 22 includes a driver plate 22*a* and a power transmission unit 22*b*. The driver plate 22*a* is supported in a manner of being movable along the extending direction of the pair of staple legs 11*a* and 11*b* of the staple 11. The power transmission unit 22*b* includes, for example, a gear that makes up a cam and a link that is displaceable by rotation of the gear. The power transmission unit 22*b* is configured to transmit the movement of the operating unit 5 to the driver plate 22*a*. The driver plate 22*a* is configured to be operated by the operating unit 5 via the power transmission unit 22*b* and to punch the staple 11. The second driver unit 22 includes a forming plate for shaping the staple 11. The second driver unit 22 further includes an attachment portion to which a cartridge accommodating the staple 11 before shaping is removably mounted.

The power transmission unit 23 is configured by, for example, a shaft connecting the power transmission unit 21*b* of the first driver unit 21 and the power transmission unit 22*b* of the second driver unit 22, etc. The power transmission unit 23 is configured to transmit the movement transmitted from the operating unit 5 to the power transmission unit 21*b* to the power transmission unit 22*b*. Accordingly, the driver plate 21*a* and the driver plate 22*a* interlock.

The first driver unit 21 and the second driver unit 22 are arranged side by side in the direction orthogonal to the sheet passing direction of the sheet P and along the sheet surface of the sheet P. A staple crown 11*c* of the staple 11 driven by the first driver unit 21 and the second driver unit 22 extends in the direction orthogonal to the sheet passing direction of the sheet P and along the sheet surface of the sheet P.

The bending unit 3 includes a first bending unit 31 and a second bending unit 32. The first bending unit 31 is an example of a bending unit or a first bending unit. The second bending unit 32 is an example of a second bending unit. The first bending unit 31 includes a first clincher 31*a*, a second clincher 31*b*, and a clamping portion 33*a*. The first bending unit 31 faces the first driver unit 21 with the sheet area 10 interposed therebetween. The clamping portion 33*a* is a surface facing the first driver unit 21. The clamping portion 33*a* is provided on a frame 34*a* of the first bending unit 31. The clamping portion 33*a* has an opening 35*a* through which the first clincher 31*a* and the second clincher 31*b* are exposed.

The first clincher 31*a* includes a receiving portion 36*a* and an acted portion 37*a*. The first clincher 31*a* is supported by the frame 34*a* in a manner of being rotatable about a shaft 38*a* as a fulcrum. The first clincher 31*a* abuts against the staple leg 11*a* during the above-described binding processing, and pivots in a bending direction of the staple leg 11*a* about the shaft 38*a* as the fulcrum. The rotation is also referred to as pivoting. The pivoting refers to rotation in a range of less than 360°. The first clincher 31*a* is movable between a bending standby position illustrated in FIG. 2A and a bending position illustrated in FIG. 2B by being rotatable about the shaft 38*a* as the fulcrum.

The receiving portion 36*a* is provided at a portion that moves in directions toward and away from the clamping portion 33*a* by the rotation of the first clincher 31*a* about the shaft 38*a* as the fulcrum. The receiving portion 36*a* is exposed to the opening 35*a* of the clamping portion 33*a*.

In a state in which the first clincher 31*a* is moved to the bending standby position, the receiving portion 36*a* is inclined in the direction away from the clamping portion 33*a* as approaching a tip end side facing the second clincher 31*b* from the shaft 38*a*.

The receiving portion 36*a* moves in a first direction indicated by an arrow A1, which is the direction toward the clamping portion 33*a* from the bending standby position, by the rotation of the first clincher 31*a* with the shaft 38*a* as the fulcrum. The receiving portion 36*a* moves from the bending position in a second direction indicated by an arrow A2 opposite to the arrow A1, which is the direction away from the clamping portion 33*a*.

The first clincher 31*a* has a tip end 300*a*. The acted portion 37*a* is provided at a portion opposite to the receiving portion 36*a* between the tip end 300*a* and the shaft 38*a*. The first clincher 31*a* moves from the bending standby position to the bending position by receiving a force for pressing the acted portion 37*a*.

The second clincher 31*b* includes a receiving portion 36*b* and an acted portion 37*b*. The second clincher 31*b* is provided on a side of the clamping portion 33*a* that is opposite to a side facing the first driver unit 21. The second clincher 31*b* is supported by the frame 34*a* in a manner of being rotatable about a shaft 38*b* as a fulcrum.

The second clincher 31*b* abuts against the staple leg 11*b* during the above-described binding processing, and pivots in a bending direction of the staple leg 11*b* about the shaft 38*b* as the fulcrum. The second clincher 31*b* is movable between the bending standby position illustrated in FIG. 2A and the bending position illustrated in FIG. 2B by being rotatable about the shaft 38*b* as the fulcrum.

The receiving portion 36*b* is provided at a portion that moves in directions toward and away from the clamping portion 33*a* by the rotation of the second clincher 31*b* with the shaft 38*b* as the fulcrum. The receiving portion 36*b* is exposed to the opening 35*a* of the clamping portion 33*a*.

In a state where the second clincher 31*b* is moved to the bending standby position, the receiving portion 36*b* is inclined in the direction away from the clamping portion 33*a* as approaching a tip end side facing the first clincher 31*a* from the shaft 38*b*.

The receiving portion 36*b* moves in the first direction indicated by the arrow A1, which is the direction toward the clamping portion 33*a* from the bending standby position, by the rotation of the second clincher 31*b* with the shaft 38*b* as the fulcrum. The receiving portion 36*b* moves from the bending position in the second direction indicated by the arrow A2, which is the direction away from the clamping portion 33*a*.

The second clincher 31*b* has a tip end 300*b*. The acted portion 37*b* is provided at a portion opposite to the receiving portion 36*b* between the tip end 300*b* and the shaft 38*b*. The second clincher 31*b* is moves from the bending standby position to the bending position by receiving a force for pressing the acted portion 37*b*. When the first clincher 31*a* moves to the bending standby position, the second clincher 31*b* interlocks and moves to the bending standby position. When the first clincher 31*a* moves to the bending position, the second clincher 31*b* interlocks and moves to the bending position. The shafts 38*a* and 38*b* are examples of a first shaft, and the tip ends 300*a* and 300*b* are examples of a first tip end.

The second bending unit 32 includes a first clincher 32*a*, a second clincher 32*b*, and a clamping portion 33*b*. The first clincher 32*a* and the second clincher 32*b* of the second bending unit 32 are examples of a pair of second clinchers. The second bending unit 32 faces the second driver unit 22 with the sheet area 10 interposed therebetween. The clamping portion 33*b* is a surface facing the second driver unit 22. The clamping portion 33*b* is provided on a frame 34*b* of the second bending unit 32. The clamping portion 33*b* has an opening 35*b* through which the first clincher 32*a* and the second clincher 32*b* are exposed.

The first clincher 32*a* and the second clincher 32*b* of the second bending unit 32 have the same configuration as the first clincher 31*a* and the second clincher 31*b* of the first bending unit 31.

The operating unit 5 includes the single motor 51 described above. The coupling portion 100 includes a first link 54. The transmission unit 101 includes a gear group 51*b* that meshes with a gear 51*a* of the motor 51, and a shaft 51*c* that rotates together with the gear group 51*b*. The transmission unit 102 includes a gear 53 and a gear 52 that meshes with the gear 53. The gear 52 is attached to the shaft 51*c*. In this way, the transmission unit 101 and the transmission unit 102 may share a part of a gear, a shaft, and the like. The transmission unit 103 includes a second link 55, a third link 55B, and a conversion unit 55C. The motor 51 is provided inside the frame 10*a* on a side of the first driver unit 21 that is opposite to a side on which the second driver unit 22 is provided along a direction intersecting the surface of the sheet P passing through the sheet area 10. The transmission unit 101 is configured to transmit rotation of the motor 51 to the power transmission unit 21*b* of the first driver unit 21 via the gear group 51*b*, the shaft 51*c*, and the like. The transmission unit 102 is configured to transmit the rotation of the motor 51 to the first link 54 configuring the coupling portion 100 via the gear group 51*b*, the shaft 51*c*, the gear 52, and the gear 53.

The gear 53 is provided inside the frame 10*a* of the driver unit 2. The gear 53 is provided outside the motor 51 relative to the first driver unit 21. In the present illustrative embodiment, an output shaft of the motor 51 protrudes inward toward the first driver unit 21, and the gear 51*a* is provided on an inner side facing the first driver unit 21. For this reason, the rotation of the motor 51 is transmitted via the transmission unit 102 including the shaft 51*c*, which extends outward of the motor 51 relative to the first driver unit 21, and the gear 53 rotates. The gear 53 includes a cam groove 53*a* that draws a trajectory whose distance from a rotation center changes. The cam groove 53*a* is an example of a cam. The cam groove 53*a* extends in a circumferential direction of the gear 53. The transmission units 101, 102, and 103 are examples of a first transmission unit.

The first link 54 is an example of a link and a first link. The first link 54 is provided inside the frame 10*c* on the one side in the direction orthogonal to the sheet passing direction of the sheet P indicated by the arrow F and along the sheet surface of the sheet P relative to the sheet area 10. The first link 54 does not protrude toward the sheet area 10 or interfere with sheet passage. The first link 54 extends along a direction in which the driver unit 2 and the bending unit 3 face each other. The first link 54 is supported in a manner of being movable in a third direction indicated by an arrow B1 and a fourth direction indicated by an arrow B2. The third direction is along the direction in which the driver unit 2 and the bending unit 3 face each other, and the fourth direction is in the opposite direction to the third direction. The third direction and the fourth direction are directions orthogonal to the sheet surface of the sheet P passing through the sheet area 10, and in this example, they are in an upper-lower direction (e.g., vertical direction).

The first link 54 includes a first cam follower 54*a* and a second cam follower 54*b*. The first cam follower 54*a* is provided on a driver unit 2 side along the direction in which the first link 54 extends. When the gear 53 rotates, the first cam follower 54*a* follows the trajectory of the cam groove 53*a*, so that the first link 54 moves in the third direction and the fourth direction. The second cam follower 54*b* is an example of the conversion unit 55C, and is provided on a bending unit 3 side along the direction in which the first link 54 extends.

The second link 55 is an example of a link and a second link. The second link 55 is provided inside the frame 10*b* of the bending unit 3. The third link 55B is an example of a second transmission unit, a link, and a third link. The third link 55B is provided inside the frame 10*b* of the bending unit 3. The third link 55B is provided on an extension line of the second link 55. The second link 55 and the third link 55B extend along a direction in which the first bending unit 31 and the second bending unit 32 are arranged side by side. The second link 55 and the third link 55B are supported in a manner of being movable in a fifth direction indicated by an arrow C1 and a sixth direction indicated by an arrow C2. The fifth direction is along the direction in which the first bending unit 31 and the second bending unit 32 are arranged side by side, and the sixth direction is in the opposite direction to the fifth direction. The fifth direction and the sixth direction are directions along the sheet surface of the sheet P passing through the sheet area 10, and in this example, they are in a horizontal direction.

The second link 55 includes a cam groove 55*a* and acting portions 56*a* and 56*b*. The third link 55B includes acting portions 56*c* and 56*d*.

The cam groove 55*a* is an example of the conversion unit 55C. The cam groove 55*a* extends obliquely relative to the moving direction of the first link 54 and the moving directions of the second link 55 and the third link 55B. The second cam follower 54*b* of the first link 54 is inserted into the cam groove 55*a*.

The acting portion 56*a* is an example of a protrusion or a first protrusion. The acting portion 56*a* faces the acted portion 37*a* of the first clincher 31*a* of the first bending unit 31. The acting portion 56*b* is an example of a protrusion or a first protrusion. The acting portion 56*b* faces the acted portion 37*b* of the second clincher 31*b* of the first bending unit 31. The acting portion 56*c* is an example of a second protrusion. The acting portion 56*c* faces the acted portion 37*a* of the first clincher 32*a* of the second bending unit 32. The acting portion 56*d* is an example of a second protrusion. The acting portion 56*d* faces the acted portion 37*b* of the second clincher 32*b* of the second bending unit 32.

FIG. 3A illustrates a state in which the first clincher 31*a* and the second clincher 31*b* of the first bending unit 31 and the first clincher 32*a* and the second clincher 32*b* of the second bending unit 32 are in the bending standby position as illustrated in FIG. 2A. When the first link 54 moves in the third direction indicated by the arrow B1 from this state, the second cam follower 54*b* of the first link 54 presses a lower surface of the inclined cam groove 55*a* of the second link 55. Accordingly, the second link 55 moves in the fifth direction indicated by the arrow C1.

FIG. 3B illustrates a state in which the first clincher 31*a* and the second clincher 31*b* of the first bending unit 31 and the first clincher 32*a* and the second clincher 32*b* of the second bending unit 32 are in the bending positions as illustrated in FIG. 2B. When the first link 54 moves in the fourth direction indicated by the arrow B2 from this state, the second cam follower 54*b* of the first link 54 presses an upper surface of the inclined cam groove 55*a* of the second link 55. Accordingly, the second link 55 moves in the sixth direction indicated by the arrow C2.

When the gear 53 rotates by a prescribed angle in a prescribed direction, the first cam follower 54*a* follows the trajectory of the cam groove 53*a*, so that the first link 54 moves in the third direction or the fourth direction. From a usage form of the stapler 1A, the moving direction of the first link 54 is the upper-lower direction, and the moving direction of the second link 55 is the horizontal direction. Accordingly, rotation operation of the gear 53 is converted into a linear motion of the first link 54 in the upper-lower direction, which is orthogonal to the sheet surface of the sheet P passing through the sheet area 10, and the linear motion of the first link 54 in the upper-lower direction (which may be referred to as the vertical linear motion of the first link 54) is converted into a linear motion of the second link 55 in the horizontal direction, which is aligned with the sheet surface of the sheet P passing through the sheet area 10. That is, the vertical linear motion of the first link 54 is converted into a horizontal linear motion of the second link 55.

As described above, the first link 54 is located outside the sheet area 10 where the sheet P is located during the binding processing on the one side in the direction orthogonal to the sheet passing direction of the sheet P passing between the driver unit 2 and the bending unit 3 and along the sheet surface of the sheet P before and after the binding processing. The first link 54 displaces in a direction orthogonal to the sheet surface of the sheet P, following the cam groove 53*a* of the gear 53 that is an example of a cam. The second link 55 is located below the sheet area 10. The second link 55 moves in a direction along the sheet surface of the sheet P and is configured to pivot the first clincher 31*a* and the second clincher 31*b* of the first bending unit 31. The third link 55B is located below the sheet area 10. The third link 55B moves in the direction along the sheet surface of the sheet P and is configured to pivot the first clincher 32*a* and the second clincher 32*b* of the second bending unit 32. The conversion unit 55C is located between the first link 54 and the second link 55. The conversion unit 55C is configured to convert the displacement of the first link 54 in the direction orthogonal to the sheet surface of the sheet P into the displacement of the second link 55 in the direction along the sheet surface of the sheet P.

The bending unit 3 includes a support member 39. The support member 39 supports the second link 55 from below to prevent the second link 55 from bending.

[Operation Example of Stapler]

In the stapler 1A, the sheet P is conveyed until a center of the sheet P orthogonal to the sheet passing direction of the sheet P passing through the sheet area 10 is aligned with a driving position of the staple 11 by the first driver unit 21 and the second driver unit 22. In a case where this alignment is achieved, the conveying of the sheet P is stopped.

By the motor 51 of the operating unit 5 being rotated, the driver plate 21*a* of the first driver unit 21 moves in the first direction indicated by the arrow A1, which is the driving direction. The driver plate 22*a* of the second driver unit 22 interlocks with the driver plate 21*a* and moves in the driving direction.

Hereinafter, the operation will be described using the first driver unit 21 and the first bending unit 31 as an example. The driver plate 21*a* moves in the driving direction, so that the staple crown 11*c* of the staple 11 is pressed and the staple legs 11*a* and 11*b* penetrate the sheet P.

The staple leg 11*a* penetrating the sheet P comes into contact with the receiving portion 36*a* of the first clincher 31*a* of the first bending unit 31. The staple leg 11*b* penetrating the sheet P comes into contact with the receiving portion 36*b* of the second clincher 31*b* of the first bending unit 31.

When the staple crown 11*c* of the staple 11 is further pressed by the driver plate 21*a*, the staple leg 11*a* penetrating the sheet P is guided along the inclined receiving portion 36*a* and bent inward by the movement of the first clincher 31*a* to the bending standby position. The staple leg 11*b* penetrating the sheet P is guided along the inclined receiving portion 36*b* and bent inward by the movement of the second clincher 31*b* to the bending standby position.

When the motor 51 of the operating unit 5 rotates, the gear 53 rotates. When the driver plate 21*a* moves in the driving direction until the staple crown 11*c* of the staple 11 comes into contact with a front surface of the sheet P, the gear 53 moves the first link 54 in the third direction indicated by the arrow B1.

When the gear 53 further rotates, the first link 54 moves in the third direction, so that the second cam follower 54*b* of the first link 54 presses the inclined cam groove 55*a* of the second link 55. Accordingly, the second link 55 moves in the fifth direction indicated by the arrow C1.

When the second link 55 moves in the fifth direction, the acting portion 56*a* presses the acted portion 37*a* of the first clincher 31*a* of the first bending unit 31. Accordingly, the first clincher 31*a* moves from the bending standby position to the bending position by receiving a force for pressing the acted portion 37*a*. When the first clincher 31*a* moves to the bending position, the receiving portion 36*a* presses the staple leg 11*a* toward a back surface of the sheet P, and bends a tip end of the staple leg 11*a* toward the back surface of the sheet P.

When the second link 55 moves in the fifth direction, the acting portion 56*b* presses the acted portion 37*b* of the second clincher 31*b* of the first bending unit 31. Accordingly, the second clincher 31*b* moves from the bending standby position to the bending position by receiving a force for pressing the acted portion 37*b*. When the second clincher 31*b* moves to the bending position, the receiving portion 36*b* presses the staple leg 11*b* toward the back surface of the sheet P, and bends a tip end of the staple leg 11*b* toward the back surface of the sheet P.

The operation is described with the first driver unit 21 and the first bending unit 31 as an example, and operation of the second driver unit 22 and the second bending unit 32 is the same.

[Examples of Advantages of Stapler]

The coupling portion 100 is provided with the first link 54 on the one side outside the sheet area 10 in the direction orthogonal to the sheet passing direction of the sheet P indicated by the arrow F and along the sheet surface of the sheet P. Accordingly, the sheet area 10 is open upstream and downstream of the sheet passing direction of the sheet P, allowing the sheet P to pass therethrough.

Accordingly, the stapler 1A can align the driving position of the staple 11 driven by the first driver unit 21 and the second driver unit 22 with the center of the sheet P orthogonal to the sheet passing direction of the sheet P. Accordingly, the stapler 1A can bind the sheet P in a form called saddle binding.

Further, the stapler 1A includes the motor 51 in the driver unit 2, and is configured to operate the first driver unit 21 and the second driver unit 22 and to transmit a driving force of the motor 51 to the bending unit 3 through the first link 54, so that the clinchers can be operated.

Accordingly, in the stapler 1A that can bind the sheet Pin a form called saddle binding, an amount by which the bent staple legs protrude on the back surface of the sheet can be reduced. The tip ends of the staple legs can be directed to the back surface of the sheet. Further, costs can be reduced since the driver unit 2 and the bending unit 3 can be operated by the single motor 51.

The first link 54 moves (linearly moves) along the frame 10*c*. Accordingly, space required for the movement of the first link 54 does not spread in directions toward and away from the sheet area 10, and an increase in a size of the stapler can be suppressed. Further, the gear 53 is provided in the driver unit 2. Accordingly, no space for the gear 53 is necessary between the frame 10*c* and the sheet area 10, and an increase in the size of the stapler can be suppressed. The second link 55 and the third link 55B move (linearly move) along the frame 10*b*. Accordingly, space required for the movement of the second link 55 and the third link 55B does not spread in directions toward and away from the sheet area 10, and an increase in the size of the stapler can be suppressed.

When the number of sheets P to be bound increases, a load applied when the staple legs 11*a* and 11*b* of the staple 11 penetrate the bundle of sheets increases as compared with a case in which the number of sheets P is small. For this reason, in a case where the number of sheets P to be bound increases, positions of the tip ends of the staple legs 11*a* and 11*b* of the staple 11 penetrating the bundle of sheets may displace. When the tip end of the staple leg 11*a* of the staple 11 penetrating the bundle of sheets displaces to a position in which the tip end cannot come into contact with the receiving portion 36*a* of the first clincher 31*a*, the staple leg 11*a* cannot be bent. Similarly, when the tip end of the staple leg 11*b* of the staple 11 penetrating the bundle of sheets displaces to a position in which the tip end cannot come into contact with the receiving portion 36*b* of the second clincher 31*b*, the staple leg 11*b* cannot be bent.

On the other hand, the receiving portion 36*a* moves in the directions toward and away from the clamping portion 33*a* by the rotation of the first clincher 31*a* with the shaft 38*a* as the fulcrum. In a state in which the first clincher 31*a* is moved to the bending standby position, the receiving portion 36*a* is separated from the clamping portion 33*a*. Accordingly, increasing a length of the receiving portion 36*a* can increase a range in which the staple leg 11*a* can come into contact with the receiving portion 36*a*. On the other hand, in a state in which the first clincher 31*a* moves to the bending position, the receiving portion 36*a* approaches the clamping portion 33*a*. Accordingly, the staple leg 11*a* can be pressed against the back surface of the sheet P even when the receiving portion 36*a* has an increased length. Similarly, the receiving portion 36*b* moves in the directions toward and away from the clamping portion 33*b* by the rotation of the second clincher 31*b* about the shaft 38*b* as the fulcrum. In a state in which the second clincher 31*b* moves to the bending standby position, the receiving portion 36*b* is separated from the clamping portion 33*b*. Accordingly, increasing a length of the receiving portion 36*b* can increase a range in which the staple leg 11*b* can come into contact with the receiving portion 36*b*. On the other hand, in a state in which the second clincher 31*b* moves to the bending position, the receiving portion 36*b* approaches the clamping portion 33*b*. Accordingly, the staple leg 11*b* can be pressed against the back surface of the sheet P even when the receiving portion 36*b* has an increased length.

{Modifications to Stapler}

Figure 5A:
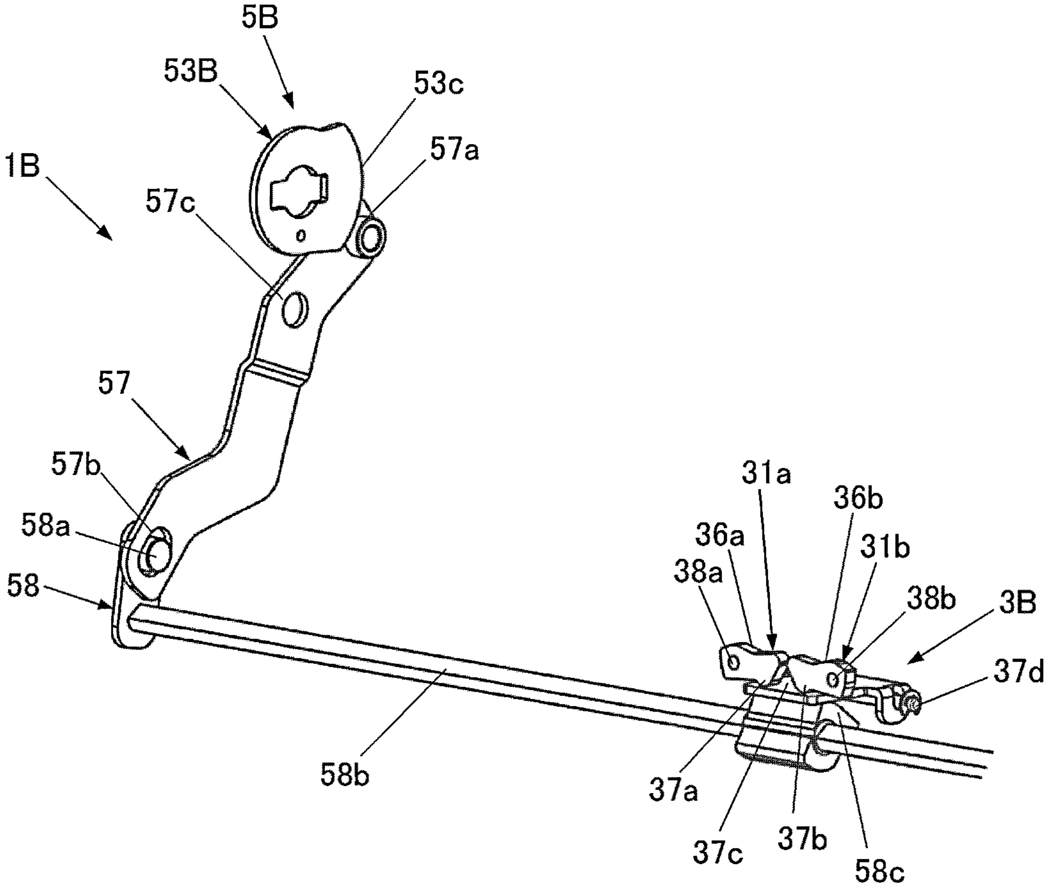
FIG. 5A is a perspective view illustrating a main portion of a first modification of the stapler according to the present illustrative embodiment.
Figure 5B:
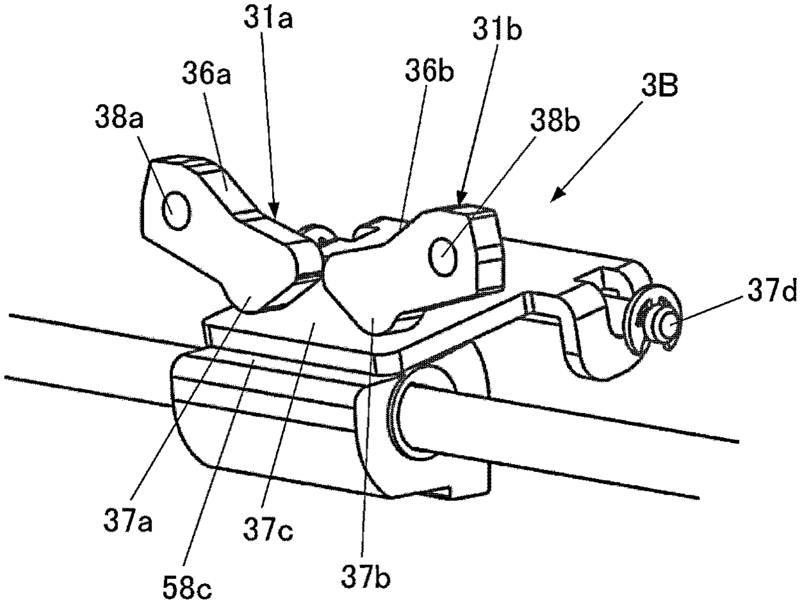
FIG. 5B is a perspective view illustrating a main portion of the first modification of the stapler according to the present illustrative embodiment.

FIGS. 5A and 5B are perspective views of main portions of a first modification of the stapler according to the present illustrative embodiment. A stapler 1B includes a sheet area, a driver unit, which are not illustrated, a bending unit 3B, and an operating unit 5B. The bending unit 3B includes the first clincher 31*a*, the second clincher 31*b*, and a first acted portion 37*c*. The first clincher 31*a* includes the receiving portion 36*a* and the second acted portion 37*a*. The first clincher 31*a* is rotatably supported about the shaft 38*a* as a fulcrum. The first clincher 31*a* rotates about the shaft 38*a* as the fulcrum and moves between a bending position illustrated in FIG. 5A and a bending standby position illustrated in FIG. 5B.

The second clincher 31*b* includes the receiving portion 36*b* and the second acted portion 37*b*. The second clincher 31*b* is rotatably supported about the shaft 38*b* as a fulcrum. The second clincher 31*b* rotates about the shaft 38*b* as the fulcrum and moves between the bending position illustrated in FIG. 5A and the bending standby position illustrated in FIG. 5B.

The first acted portion 37*c* rotates about a shaft 37*d* as a fulcrum and presses the second acted portion 37*a* of the first clincher 31*a* and the second acted portion 37*b* of the second clincher 31*b*. The first clincher 31*a* moves from the bending standby position to the bending position by receiving a force for pressing the second acted portion 37*a*. The second clincher 31*b* moves from the bending standby position to the bending position by receiving a force for pressing the second acted portion 37*b*.

The operating unit 5B includes a rotary body 53B, a first link 57, and a second link 58. The rotary body 53B is an example of a transmission unit. The rotary body 53B includes a cam 53*c* that draws a trajectory whose distance from a rotation center changes. The cam 53*c* extends in a circumferential direction of the rotary body 53B.

The first link 57 is an example of a coupling portion and a link. The first link 57 includes a cam follower 57*a* and an engaged portion 57*b*. When the rotary body 53B rotates, the cam follower 57*a* follows the trajectory of the cam 53*c*, so that the first link 57 rotates about a shaft (not illustrated) inserted into the support hole 57*c* as a fulcrum.

The second link 58 is an example of a transmission unit and a link. The second link 58 includes an engaging portion 58*a*, a shaft 58*b*, and an acting portion 58*c*. The engaging portion 58*a* is inserted into the engaged portion 57*b* of the first link 57. The acting portion 58*c* faces the first acted portion 37*c*, and rotates about the shaft 58*b* as a fulcrum when the second link 58 rotates.

Accordingly, when the rotary body 53B rotates, the first link 57 displaces (rotates) following the cam 53*c*. Further, the second link 58 displaces (rotates) following the displacement of the first link 57.

When the second link 58 displaces (rotates), the acting portion 58*c* rotates about the shaft 58*b* as the fulcrum. When the acting portion 58*c* rotates, the first acted portion 37*c* presses the second acted portion 37*a* of the first clincher 31*a* and the second acted portion 37*b* of the second clincher 31*b* by rotating about the shaft 37*d* as the fulcrum. The first clincher 31*a* moves from the bending standby position to the bending position by receiving a force for pressing the second acted portion 37*a*. The second clincher 31*b* moves from the bending standby position to the bending position by receiving a force for pressing the second acted portion 37*b*.

Figure 6A:
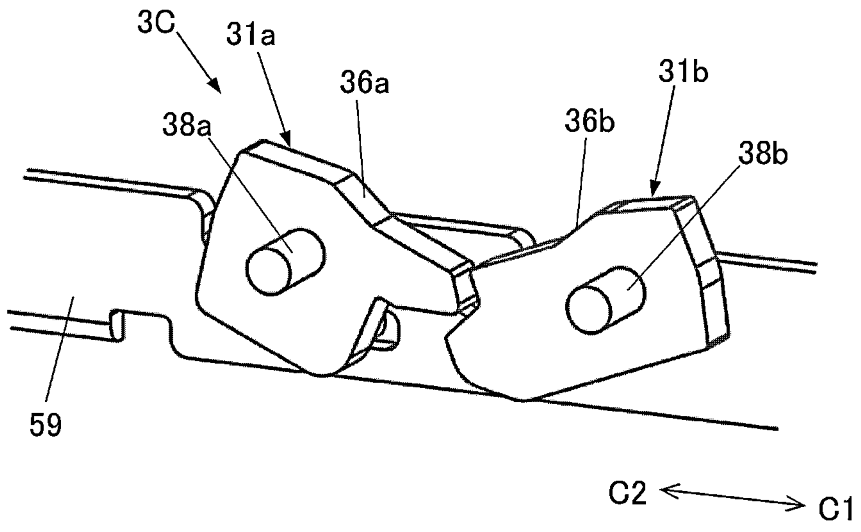
FIG. 6A is a perspective view illustrating a main portion of a second modification of the stapler according to the present illustrative embodiment.
Figure 6B:
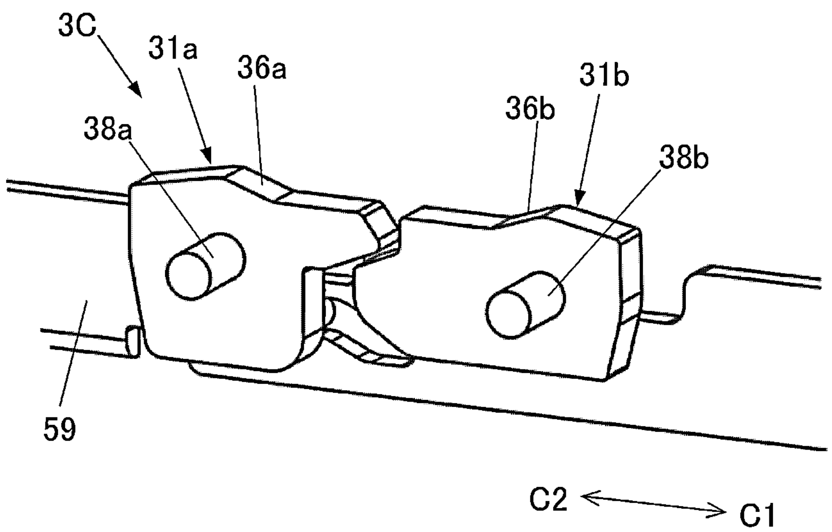
FIG. 6B is a perspective view illustrating the main portion of the second modification of the stapler according to the present illustrative embodiment.
Figure 7A:
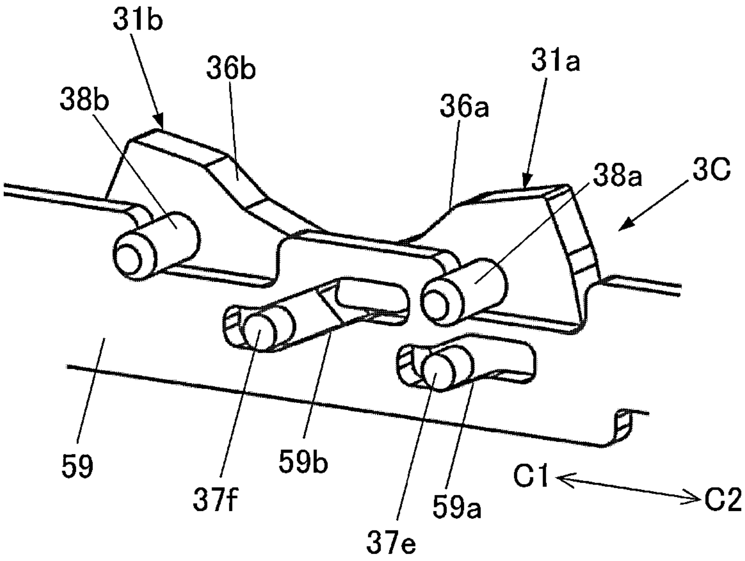
FIG. 7A is a perspective view illustrating a main portion of the second modification of the stapler of the present illustrative embodiment.
Figure 7B:
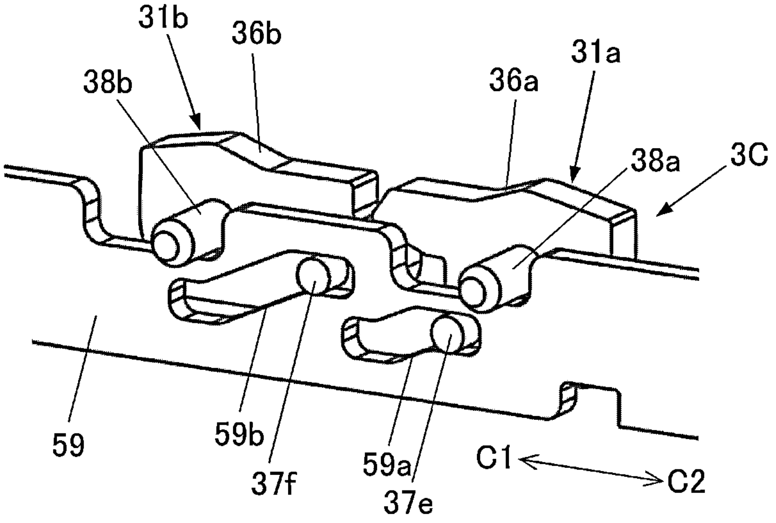
FIG. 7B is a perspective view illustrating the main portion of the second modification of the stapler according to the present illustrative embodiment.

FIGS. 6A, 6B, 7A, and 7B are perspective views of a main portion of a second modification of the stapler according to the present illustrative embodiment. FIGS. 6A and 6B are perspective views of a main portion of a bending unit 3C viewed from a front surface of the stapler. FIGS. 7A and 7B are perspective views of the main portion of the bending unit 3C viewed from a back surface of the stapler.

The bending unit 3C includes the first clincher 31*a* and the second clincher 31*b*. The first clincher 31*a* includes the receiving portion 36*a* and an acted portion 37*e*. The first clincher 31*a* is rotatably supported about the shaft 38*a* as a fulcrum. The first clincher 31*a* rotates about the shaft 38*a* as the fulcrum and moves between a bending standby position illustrated in FIGS. 6A and 7A and a bending position illustrated in FIGS. 6B and 7B. The acted portion 37*e* is configured by a shaft protruding from the first clincher 31*a*.

The second clincher 31*b* includes the receiving portion 36*b* and an acted portion 37*f*. The second clincher 31*b* is rotatably supported about the shaft 38*b* as a fulcrum. The second clincher 31*b* rotates about the shaft 38*b* as the fulcrum and moves between the bending standby position illustrated in FIGS. 6A and 7A and the bending position illustrated in FIGS. 6B and 7B. The acted portion 37*f* is configured by a shaft protruding from the first clincher 31*a*.

The second link 59 is an example of a transmission unit and a link. The second link 59 is supported in a manner of being movable in the fifth direction indicated by the arrow C1 and the sixth direction indicated by the arrow C2 in the opposite direction to the fifth direction. The second link 59 includes acting portions 59*a* and 59*b*.

The acting portion 59*a* is configured by a cam groove extending along the fifth direction and the sixth direction and having an inclined surface along a direction in which the first clincher 31*a* rotates. The acting portion 59*a* receives the acted portion 37*e* of the first clincher 31*a*. The acting portion 59*b* is configured by a cam groove extending along the fifth direction and the sixth direction and having an inclined surface along a direction in which the second clincher 31*b* rotates. The acting portion 59*b* receives the acted portion 37*f* of the second clincher 31*b*.

When the second link 59 moves in the fifth direction, the acting portion 59*a* presses the acted portion 37*e* of the first clincher 31*a* with the inclined surface. Accordingly, the first clincher 31*a* moves from the bending standby position to the bending position by receiving a force for pressing the acted portion 37*e*. When the second link 59 moves in the fifth direction, the acting portion 59*b* presses the acted portion 37*f* of the second clincher 31*b* with the inclined surface. Accordingly, the second clincher 31*b* moves from the bending standby position to the bending position by receiving a force for pressing the acted portion 37*f*.

In the bending unit 3C, the first clincher 31*a* and the second clincher 31*b* can overlap the second link 59 along axial directions of the respective shafts 38*a* and 38*b*. Accordingly, a height of the bending unit 3C along a direction in which the first clincher 31*a* and the second clincher 31*b* rotate can be reduced.

FIGS. 8A to 8D are front views illustrating modifications of the stapler of the present illustrative embodiment. In FIG. 1A and the like described above, the single motor 51 is provided between the driver unit 2 and the coupling portion 100, specifically, between the driver unit 2 and the first link 54 configuring the coupling portion 100 as well as the gear 53 configuring the transmission unit 102. On the other hand, in a stapler 1C illustrated in FIG. 8A, the single motor 51 is provided to an intermediate portion of the coupling portion 100 and is configured to operate the driver unit 2 and the bending unit 3. In this case, the output shaft of the motor 51 may protrude outward, and a gear of the motor 51 may mesh with the gear 53 directly or via another gear. In a stapler 1D illustrated in FIG. 8B, the single motor 51 is provided between the coupling portion 100 and the bending unit 3 and is configured to operate the driver unit 2 and the bending unit 3. In the configuration in which the motor 51 is provided between the coupling portion 100 and the bending unit 3, the transmission unit 101 may transmit the driving force of the motor 51 to the driver unit 2 via the coupling portion 100. The coupling portion 100 is not limited to a link, and may be a gear group or the like that couples the driver unit 2 and the bending unit 3 to enable transmission unit of a driving force.

Figure 8A:
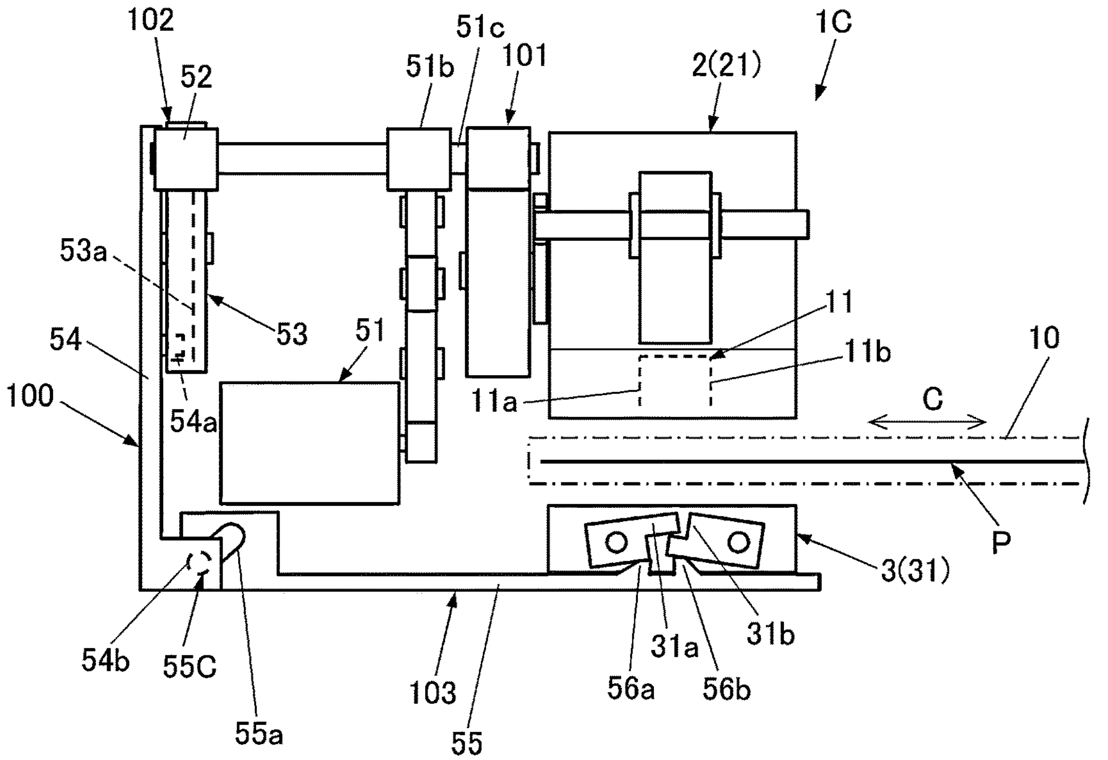
FIG. 8A is a front view illustrating a modification of the stapler according to the present illustrative embodiment.
Figure 8B:
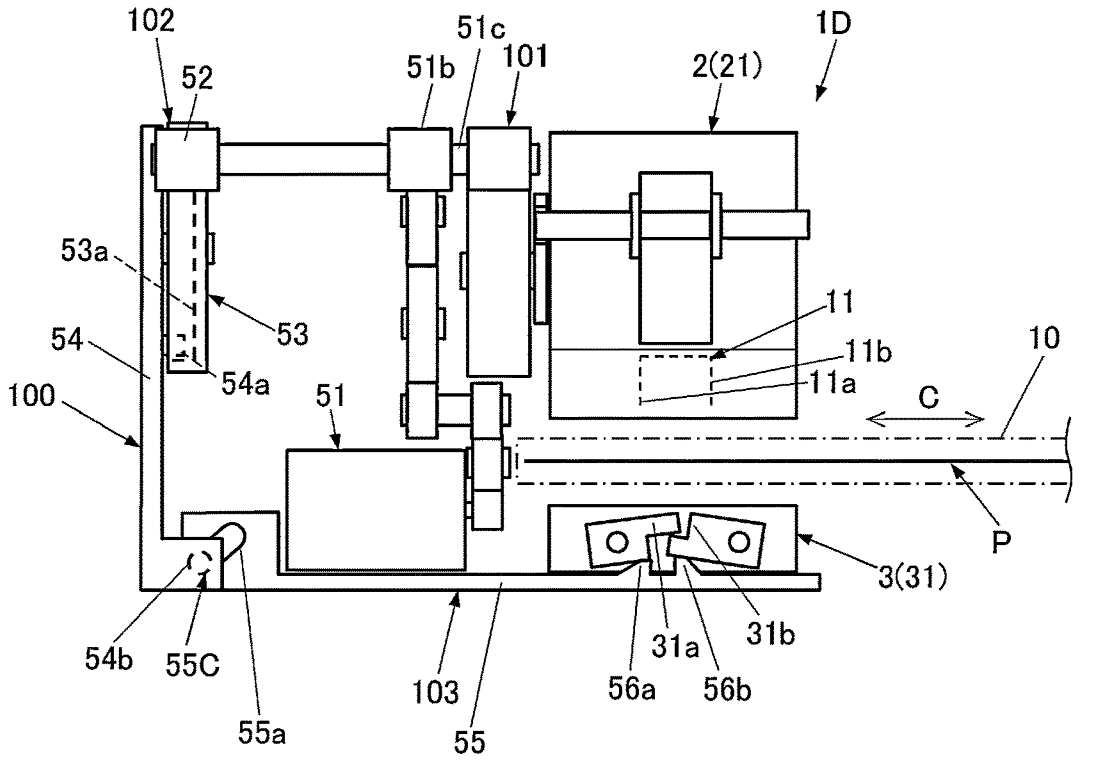
FIG. 8B is a front view illustrating a modification of the stapler according to the present illustrative embodiment.
Figure 8C:
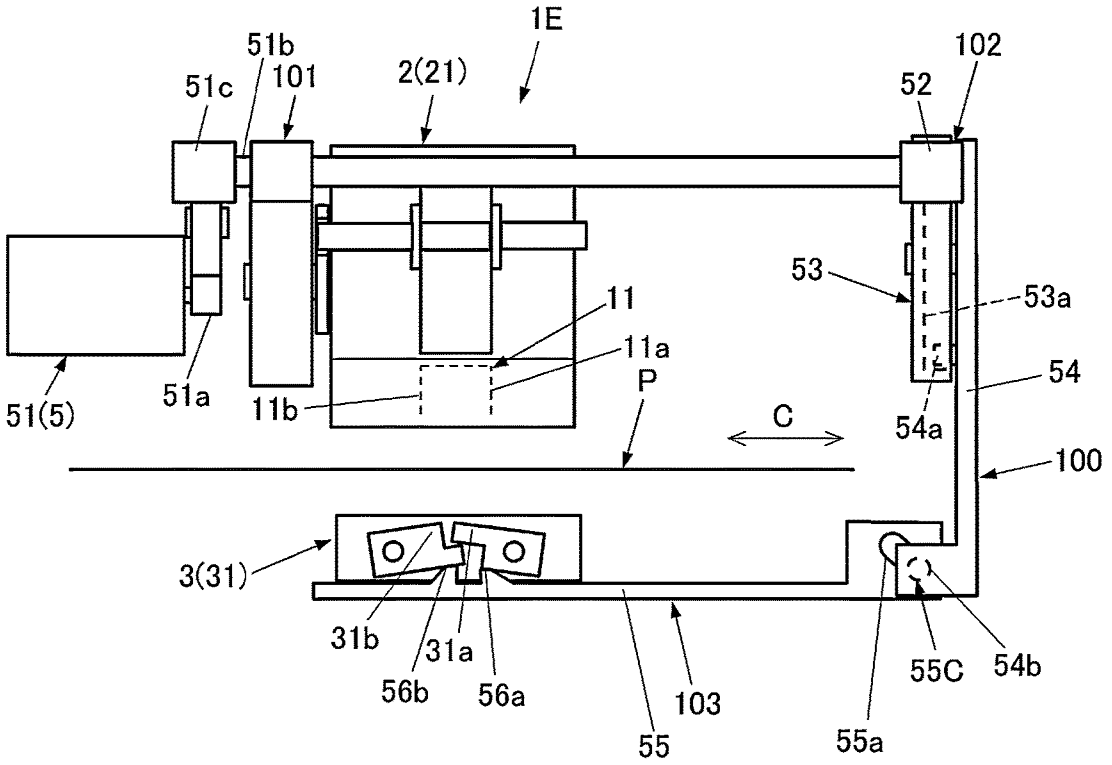
FIG. 8C is a front view illustrating a modification of the stapler according to the present illustrative embodiment.
Figure 8D:
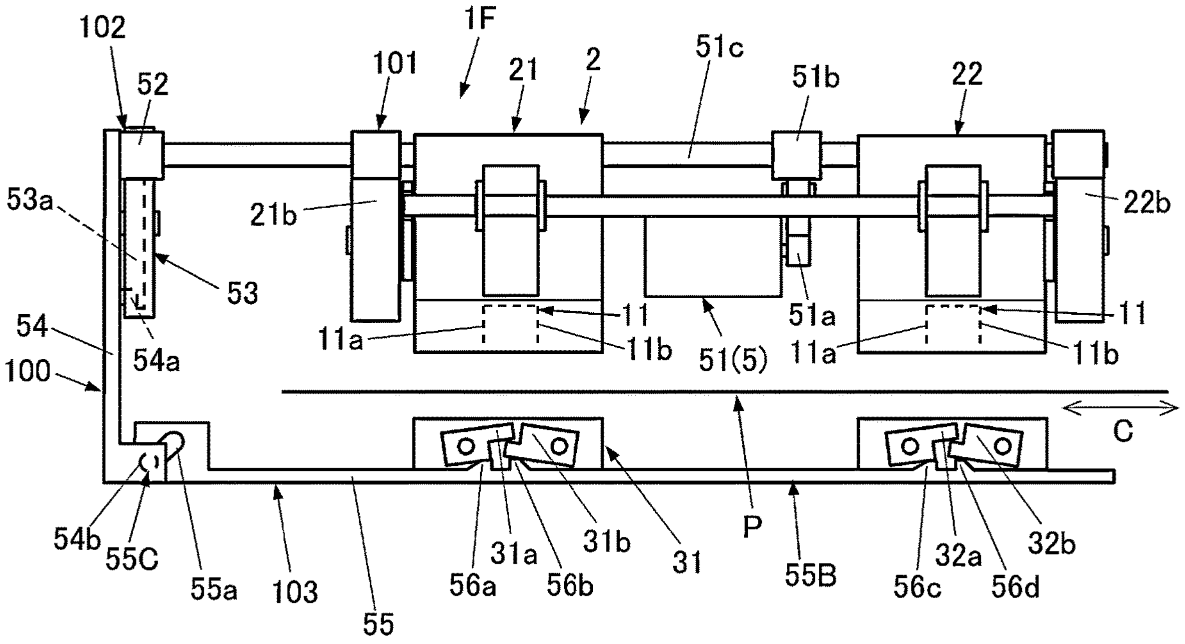
FIG. 8D is a front view illustrating a modification of the stapler according to the present illustrative embodiment.

Further, in a stapler 1E illustrated in FIG. 8C, when a side on which the coupling portion 100 (first link 54) is provided is one side in the direction along the sheet surface of the sheet P, the single motor 51 is provided on the other side in the direction along the sheet surface of the sheet P with the driver unit 2 interposed in between. The single motor 51 is configured to operate the driver unit 2 and the bending unit 3. In this case, in the configuration in which the driver unit 2 includes the first driver unit 21 and the second driver unit 22, the coupling portion 100 may be provided on the one side in the direction along the sheet surface of the sheet P with the first driver unit 21 and the second driver unit 22 interposed in between, and the single motor 51 may be provided on the other side. As illustrated in FIG. 8D, in a stapler IF in which the driver unit 2 includes the first driver unit 21 and the second driver unit 22, the single motor 51 may be provided between the first driver unit 21 and the second driver unit 22.

What is claimed is:

1. A stapler for performing binding processing of binding a sheet with a staple, the stapler comprising:

a driver unit provided in a position orthogonal to a sheet surface of the sheet in a case of performing the binding processing, the driver unit being configured to drive the staple to the sheet;

a bending unit provided in a position facing the driver unit through the sheet in the case of performing the binding processing, the bending unit being configured to bend a staple leg of the staple that is driven by the driver unit and penetrates the sheet;

a single motor configured to operate the driver unit and the bending unit;

a coupling portion coupling the driver unit and the bending unit on one side in a direction orthogonal to a sheet passing direction of the sheet passing between the driver unit and the bending unit and along the sheet surface in the case of performing the binding processing; and a transmission unit configured to transmit a driving force of the motor to at least one of the driver unit or the bending unit via the coupling portion, wherein the transmission unit is configured to transmit the driving force of the motor to the bending unit via the coupling portion.

2. A stapler for performing binding processing of binding a sheet with a staple, the stapler comprising:

a driver unit provided in a position orthogonal to a sheet surface of the sheet in a case of performing the binding processing, the driver unit being configured to drive the staple to the sheet;

a bending unit provided in a position facing the driver unit through the sheet in the case of performing the binding processing, the bending unit being configured to bend a staple leg of the staple that is driven by the driver unit and penetrates the sheet;

a single motor configured to operate the driver unit and the bending unit;

a coupling portion coupling the driver unit and the bending unit on one side in a direction orthogonal to a sheet passing direction of the sheet passing between the driver unit and the bending unit and along the sheet surface in the case of performing the binding processing; and a transmission unit configured to transmit a driving force of the motor to at least one of the driver unit or the bending unit via the coupling portion, wherein the motor is provided in a freely selected position between the driver unit and the coupling portion, between the coupling portion and the bending unit to an intermediate portion of the coupling portion, or on another side in a direction along the sheet surface with the driver unit interposed in between.

3. The stapler according to claim 2, wherein the motor is provided between the driver unit and the coupling portion.

4. A stapler for performing binding processing of binding a sheet with a staple, the stapler comprising:

a driver unit provided in a position orthogonal to a sheet surface of the sheet in a case of performing the binding processing, the driver unit being configured to drive the staple to the sheet;

a bending unit provided in a position facing the driver unit through the sheet in the case of performing the binding processing, the bending unit being configured to bend a staple leg of the staple that is driven by the driver unit and penetrates the sheet;

a single motor configured to operate the driver unit and the bending unit;

a coupling portion coupling the driver unit and the bending unit on one side in a direction orthogonal to a sheet passing direction of the sheet passing between the driver unit and the bending unit and along the sheet surface in the case of performing the binding processing; and a transmission unit configured to transmit a driving force of the motor to at least one of the driver unit or the bending unit via the coupling portion, wherein the bending unit includes a pair of clinchers that abut against the staple leg during the binding processing, each of the pair of clinchers having a tip end that is pivotable in a bending direction of the staple leg about a shaft as a fulcrum, and wherein the transmission unit is configured to pivot the clinchers.

5. The stapler according to claim 4, wherein the coupling portion includes a first link located on the one side outside a sheet area in which the sheet is located in the case of performing the binding processing, the first link being displaceable in a direction orthogonal to the sheet surface, and wherein the transmission unit includes:

a cam configured to rotate by receiving the driving force of the motor and displace the first link in the direction orthogonal to the sheet surface;

a second link located below the sheet area and configured to move in a direction along the sheet surface and to pivot the clinchers; and a conversion unit located between the first link and the second link and configured to convert displacement of the first link in the direction orthogonal to the sheet surface into displacement of the second link in the direction along the sheet surface.

6. The stapler according to claim 5, wherein the second link has a protrusion that protrudes in the bending direction and is abuttable between the shaft of one of the clinchers and its tip end, and wherein the protrusion is configured to pivot the one of the clinchers in the bending direction while abutting against the one of the clinchers as the second link is displaced in the direction along the sheet surface.

7. The stapler according to claim 6, wherein the driver unit is a first driver unit configured to drive the staple as a first staple to the sheet, wherein the bending unit is a first bending unit configured bend a staple leg of the first staple, wherein the transmission unit is a first transmission unit configured to transmit the driving force of the motor to at least one of the first driver unit or the first bending unit, wherein the stapler further comprises:

a second driver unit adjacent to the driver unit on the other side in the direction orthogonal to the sheet passing direction and along the sheet surface, the second driver unit being configured to drive a second staple to the sheet; and a second bending unit provided in a position facing the second driver unit through the sheet during the binding processing, the second bending unit being configured to bend a staple leg of the second staple that is driven by the second driver unit and penetrates the sheet, wherein the single motor is further configured to operate the second driver unit, and wherein the transmission unit includes a second transmission unit that is configured to transmit the driving force of the single motor to the second bending unit.

8. The stapler according to claim 7, wherein the second transmission unit includes a third link continuous with the second link and configured to move the second bending unit by displacing in the direction along the sheet surface in conjunction with the second link.

9. The stapler according to claim 8, wherein the one of the clinchers is a first clincher having a first tip end pivotable in a bending direction of the staple leg of the first staple about a first shaft, and wherein the protrusion of the second link is a first protrusion that protrudes in the bending direction of the staple leg of the first staple and is abuttable between the first shaft of the first clincher and the first tip end, and wherein the second bending unit includes a pair of second clinchers, each having a second tip end that is pivotable in a bending direction of the staple leg of the second staple with a second shaft as a fulcrum, wherein the third link has a second protrusion that protrudes in the bending direction of the staple leg of the second staple and is abuttable between the second shaft and the second tip end of the second clincher, and wherein the second protrusion is configured to rotate the second clincher in the bending direction of the staple leg of the second staple while abutting against the second clincher as the third link is displaced.

10. The stapler according to claim 7, wherein the motor is provided in a position between the first driver unit and the second driver unit.

* * * * *